United States Patent [19]

Lassankse

[11] Patent Number: 4,903,648

[45] Date of Patent: Feb. 27, 1990

[54] ENGINE WITH IMPROVED EXHAUST GAS SENSING

[75] Inventor: George G. Lassankse, Oconomowoc, Wis.

[73] Assignee: Outboard Marine Corporation, Waukegan, Ill.

[21] Appl. No.: 338,743

[22] Filed: Apr. 14, 1989

[51] Int. Cl.$^4$ ........................ G01N 27/46; F01L 13/00

[52] U.S. Cl. .................................. 123/65 R; 123/489; 60/276

[58] Field of Search ..................... 123/65 R, 440, 489, 123/509; 60/276

[56] References Cited

U.S. PATENT DOCUMENTS

| | | | |
|---|---|---|---|
| 4,225,559 | 9/1980 | Achari et al. | 60/276 |
| 4,228,128 | 10/1980 | Esper et al. | 60/276 |
| 4,313,810 | 2/1982 | Niwa et al. | 60/276 |
| 4,362,605 | 12/1982 | Bozon et al. | 60/276 |
| 4,484,440 | 11/1984 | Oki et al. | 60/276 |
| 4,617,795 | 10/1986 | Abthoff et al. | 60/276 |
| 4,656,830 | 4/1987 | Ohno et al. | 60/276 |
| 4,773,376 | 9/1988 | Uchikawa et al. | 123/440 |
| 4,805,571 | 2/1989 | Humphrey | 123/73 C |

*Primary Examiner*—David A. Okonsky

*Attorney, Agent, or Firm*—Michael, Best & Friedrich

[57] ABSTRACT

A two-stroke internal combustion engine is provided including an engine block, a combustion chamber defined in the engine block and adapted to have a piston reciprocate therein along an axis between a top dead center position and a bottom dead center position, and to have air and fuel combusted therein, thereby causing production of an exhaust gas and at least partially causing the piston to reciprocate, the internal combustion engine further comprising an exhaust port communicating with the combustion chamber and adapted to conduct the exhaust gas away from the combustion chamber, a sensor chamber at least partially defined in the engine block, a passage extending from the sensor chamber to the combustion chamber at a location axially between the exhaust port and the top dead center position, valve structure, operable in the passage for allowing flow of exhaust gas from the combustion chamber to the sensor chamber, and for preventing flow of non-combusted air and fuel from the combustion chamber to the sensor chamber, an exit conduit adapted to conduct at least a portion of the exhaust gas in the sensor chamber away from the sensor chamber, and structure at least partially located in the sensor chamber for sensing a condition in the exhaust gas.

21 Claims, 1 Drawing Sheet

ENGINE WITH IMPROVED EXHAUST GAS SENSING

BACKGROUND OF THE INVENTION

The invention relates, in general, to two-stroke internal combustion engines, and, more particularly, to detection of a condition in the combusted fuel-air mixture of two-stroke internal combustion engines.

Various constructions of exhaust gas sensors for internal combustion engines have been heretofore proposed. Various arrangements of internal combustion engines, or portions thereof, employing exhaust gas sensors for air-fuel ratio control in a four-stroke engine have also been heretofore proposed. Typically, exhaust sensors used in four-stroke engine applications function as an electrolytic cell and provide an output signal which depends on oxygen concentration in exhaust gasses produced by the engine, which concentration is measured, for example, at an exhaust pipe.

Direct application of four-stroke engine exhaust sensing techniques to two-stroke engines is not possible due to overscavanging that occurs in two-stroke engines, which overscavanging affects the oxygen concentration in exhaust gasses produced by an engine and flowing through an exhaust pipe.

Attention is directed to the following U.S. Patents which disclose such sensing applications:

| U.S. Pat. No. | Inventor | Issued |
|---|---|---|
| 4,225,559 | Achari et al. | September 30, 1980 |
| 4,228,128 | Esper et al. | October 14, 1980 |
| 4,313,810 | Niwa et al. | February 2, 1982 |
| 4,362,605 | Bozon et al. | December 7, 1982 |
| 4,484,440 | Oki et al. | November 27, 1984 |
| 4,617,795 | Abthoff et al. | October 21, 1986 |
| 4,656,830 | Ohno et al. | April 14, 1987 |

Attention is also directed to U.S. patent application Ser. No. 131,449, filed Dec. 11, 1987.

Attention is also directed to SAE Paper 840141, which relates to exhaust sensors.

SUMMARY OF THE INVENTION

The invention provides a two-stroke internal combustion engine comprising an engine block, a combustion chamber defined in the engine block and adapted to have a piston reciprocate therein along an axis between a top dead center position and a bottom dead center position, and to have air and fuel combusted therein, thereby causing production of an exhaust gas and at least partially causing the piston to reciprocate, an exhaust port in the engine block and communicating with the combustion chamber and adapted to conduct the exhaust gas away from the combustion chamber, means defining a sensor chamber, a passage extending from the sensor chamber to the combustion chamber at a location axially between the exhaust port and the top dead center position, valve means operable in the passage between an open position for allowing flow of exhaust gas from the combustion chamber to the sensor chamber and a closed position for substantially preventing flow of non-combusted air and fuel from the combustion chamber to the sensor chamber, an exit conduit adapted to conduct at least a portion of the exhaust gas in the sensor chamber away from the sensor chamber, and means at least partially located in the sensor chamber for sensing a condition in the exhaust gas.

One aspect of the invention provides a two-stroke internal combustion engine comprising an engine block, a first combustion chamber defined in the engine block and adapted to have a first piston reciprocate therein along a first axis between a top dead center position and a bottom dead center position in the first combustion chamber, and to have air and fuel combusted therein, thereby causing production of an exhaust gas and at least partially causing the first piston to reciprocate, a second combustion chamber defined in the engine block and adapted to have a second piston reciprocate therein along a second axis between a top dead center position and a bottom dead center position in the second combustion chamber, and to have air and fuel combusted therein, thereby causing production of an exhaust gas and at least partially causing the second piston to reciprocate, a first exhaust port in the engine block communicating with the first combustion chamber and adapted to conduct the exhaust gas away from the first combustion chamber, a second exhaust port in the engine block communicating with the second combustion chamber and adapted to conduct the exhaust gas away from the second combustion chamber, means defining a sensor chamber, a first passage extending from the sensor chamber to the first combustion chamber at a location between, with respect to the first axis, the first exhaust port and the top dead center position in the first combustion chamber, a second passage extending from the sensor chamber to the second combustion chamber at a location between, with respect to the second axis, the second exhaust port and the top dead center position in the second combustion chamber, an exit conduit adapted to conduct at least a portion of the exhaust gas in the sensor chamber away from the sensor chamber, a first valve means operable in the first passage between a first open position for allowing flow of exhaust gas from the first combustion chamber to the sensor chamber and a first closed position for substantially preventing flow of non-combusted air and fuel from the first combustion chamber to the sensor chamber, a second valve means operable in the second passage between a second open position for allowing flow of exhaust gas from the second combustion chamber to the sensor chamber and a second closed position for substantially preventing flow of non-combusted air and fuel from the second combustion chamber to the sensor chamber, and means at least partially located in the sensor chamber for sensing a condition in the exhaust gas in the sensor chamber.

One embodiment of the invention provides a two-stroke internal combustion engine comprising an engine block, a combustion chamber defined in the engine block and adapted to have air and fuel combusted therein, a piston adapted to reciprocate in the combustion chamber along an axis between a top dead center position and a bottom dead center position, an exhaust port in the engine block and communicating with the combustion chamber and adapted to conduct combusted air and fuel away from the combustion chamber, means defining a sensor chamber, a passage extending from the sensor chamber to the combustion chamber at a location axially between the top dead center position and the exhaust port, proximate the exhaust port, an exit conduit adapted to conduct combusted air and fuel from the sensor chamber, a disk valve operable in the passage between an open position and a closed position, the disk valve including a disk and a spring exerting a force on the disk, the disk being adapted to travel against the force of the spring to the open position to allow flow of combusted air and fuel from the combustion chamber to the sensor chamber when pressure in the combustion chamber exceeds a predetermined pressure, an oxygen sensor at least partially located in the sensor chamber, and means for supplying air and fuel to the combustion chamber in an adjustable ratio and for adjusting the air and fuel ratio.

DESCRIPTION OF THE PREFERRED EMBODIMENT

Figure 1:
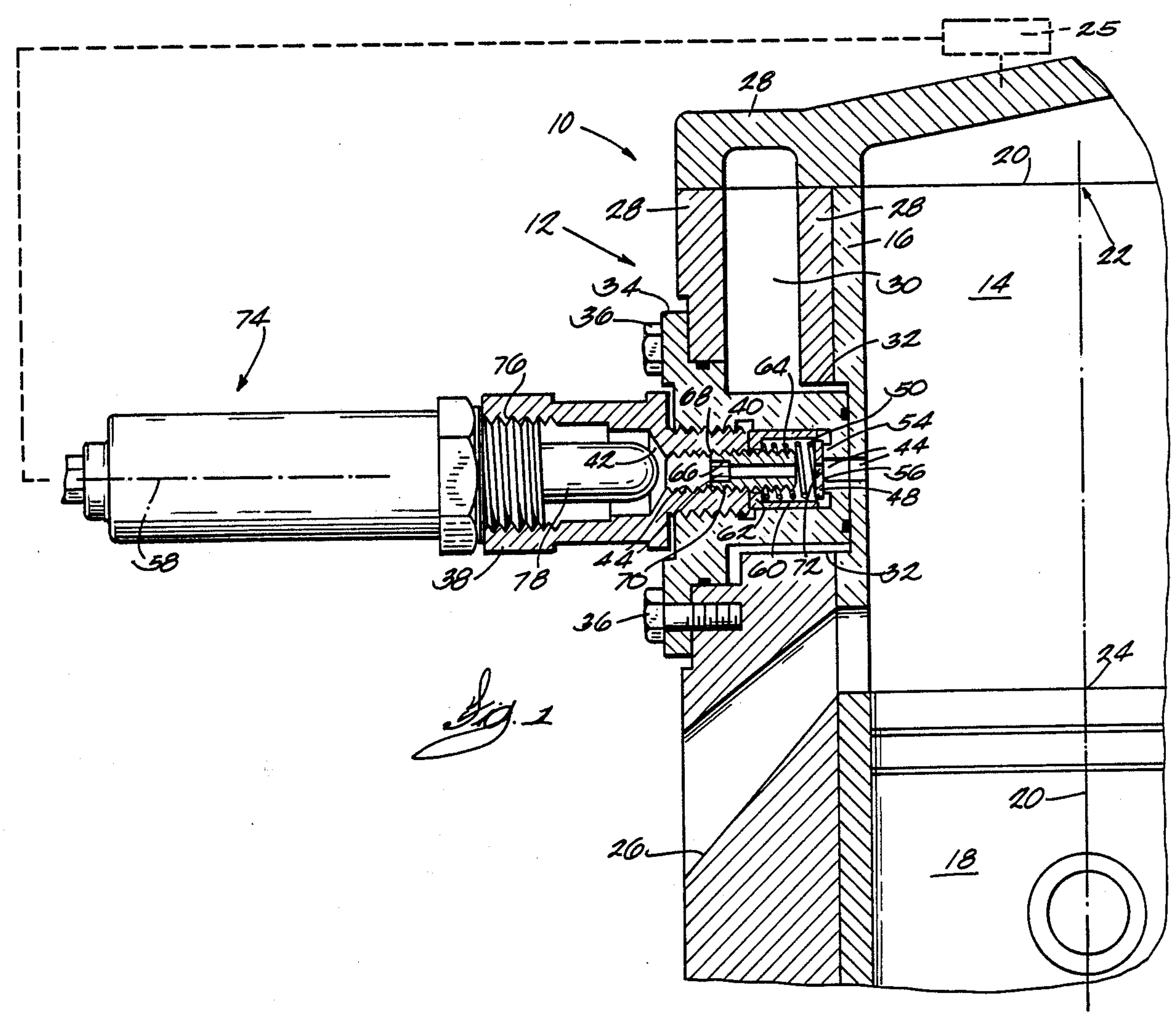
FIG. 1 is a fragmentary illustration of a two stroke internal combustion engine incorporating various of the features of the invention.

Shown fragmentarily in FIG. 1 is a two-stroke internal combustion engine 10 which includes an engine block 12, a combustion chamber 14 defined in the engine block 12 by a cylinder liner 16 and adapted to have a piston 18 reciprocate therein along an axis 20 and relative to a top dead center position 22 and a bottom dead center position 24.

The combustion chamber 14 is adapted to have air and fuel combusted therein, thereby causing production of an exhaust gas, and at least partially causing the piston 18 to reciprocate.

The internal combustion engine 10 further comprises an exhaust port 26 in the engine block 12 and communicating with the combustion chamber 14 and adapted to conduct the exhaust gas away from the combustion chamber 14.

The engine block 12 comprises a main portion 28 which defines a chamber 30 adapted to receive a cooling fluid, and which further defines a recess 32 which recess can also be partially defined by the cylinder liner 16. The engine block 12 further comprises a valve body 34 positioned in the recess 32 and fastened to the main portion 28 of the engine block 12 by fasteners 36. Means are provided for defining a sensor chamber 42. While various means could be employed, in the illustrated embodiment, the engine block 12 includes a chamber defining member 38 mounted to the valve body 34 by means of threads 40 and defining the sensor chamber 42.

A passage 44 extends from the sensor chamber 42 to the combustion chamber 14. The passage 44 extends from the sensor chamber 42 through the chamber defining member 38, through the valve body 34, and through the cylinder liner 16 to the combustion chamber 14 at a position slightly above the juncture of the exhaust port 26 and the combustion chamber 14, and between the exhaust port 26 and the top dead center position 22, with respect to the axis 20 of piston reciprocation.

The internal combustion engine 10 further includes valve means, operable in the passage 44, for allowing flow of exhaust gas from the combustion chamber 14 to the sensor chamber 42, and for preventing flow of non-combusted air and fuel from the combustion chamber to the sensor chamber. While other valve means could be utilized, the valve means illustrated in the figures comprises a disk 48 and a spring 50 exerting a force on the disk 48.

The valve body 34 includes a valve seat 54 against which the disk 48 is normally biased by the spring 50, at which time the disk 48 is in a "closed" position and preventing flow of non-combusted air and fuel from the combustion chamber 14 to the sensor chamber 42 by substantially blocking the passage 44. Preferably, the valve seat 54 is lapped, and the disk 48 includes a corresponding lapped side 56.

During each combustion stroke of the piston 18, the disk 48 travels along an axis 58, against the spring 50, to an "open" position when pressure in the combustion chamber 14 exceeds a predetermined pressure. Optionally, the internal combustion engine 10 further includes means for adjusting the predetermined pressure. While various means can be employed in FIGS. 1 and 2 this means comprises means for adjustably compressing the spring 50. More particularly, while various means can be employed for adjustably compressing the spring 50, in the embodiment shown in FIGS. 1 and 2 the means for adjustably compressing the spring 50 comprises the chamber defining means 38 being adjustably movable relative to the valve body 34 along the axis 58. Optionally, the means for adjustably compressing the spring 50 further includes a sleeve 60 supported by the valve body 34, movable relative to the valve body 34 along the axis 58, surrounding and guiding the spring 50, and including a portion 62 separating the spring 50 from the chamber defining member 38.

Also optionally, the internal combustion engine 10 further includes means for allowing the disk 48 to travel against the spring 50 by a distance not exceeding a predetermined distance, and for allowing the predetermined distance to be adjusted. While various means may be employed, in the illustrated embodiment this means comprises a stop member 64 supported by the chamber defining member 38, having a position that is adjustable along the axis 58, relative to the chamber defining member 38, and having a bore or hollow portion 66 extending along the axis 58 and defining a portion of the passage 44. The stop member 64 shown in FIG. 1 is adjustably supported by the chamber defining member 38 by threads 68, and the hollow portion 66 includes a portion 70 adapted to be engaged by an allen wrench or the like for adjustment of the position of the stop member 64 relative to the chamber defining member 38.

The internal combustion engine 10 further includes an exit conduit adapted to conduct at least a portion of the exhaust gas in the sensor chamber 42 away from the sensor chamber 42. In FIG. 1, the exit conduit comprises the passage 44 and an aperture 72 through the disk 48. However, the exit conduit could lead from the sensor chamber 42 directly away from the internal combustion engine 10. The fluid resistance of the aperture 72 is significantly greater than the fluid resistance of the portion of the passage 44 that is between the disk 48 and the combustion chamber 14, which portion has a volume that is sufficiently small so that non-combusted air and fuel is not sampled.

The internal combustion engine 10 further includes means at least partially located in the sensor chamber 42 for sensing a condition in the exhaust gas. While various means could be employed, in the illustrated embodiment the sensing means is adapted to sense the concentration of a chemical compound in the sensor chamber 42. More particularly the sensing means comprises a heated zirconia oxygen sensor 74, which is mounted to the chamber defining member 38 by threads 76, and which includes a portion 78 interior of the chamber defining member 38. A heated zirconia oxygen sensor is used in the illustrated embodiment because of the relatively low exhaust temperatures developed by two-stroke internal combustion engines. Heated zirconia oxygen sensors are discussed in greater detail in SAE Paper 840141, "Heated Zirconia Oxygen Sensor for Stoichiometric and Lean Air Fuel Ratios", Robert Bosch GMBH.

The internal combustion engine 10 further includes means for supply air and fuel to the combustion chamber in an adjustable ratio and for adjusting the air and fuel ratio responsive to the concentration sensed by the sensing means. While various other means for supplying air and fuel and for adjusting the air and fuel ratio could be employed, in FIG. 1 this means comprises an electronic fuel injection system 25, which is shown in dotted outline. Any suitable fuel injection system could be employed.

Figure 2:
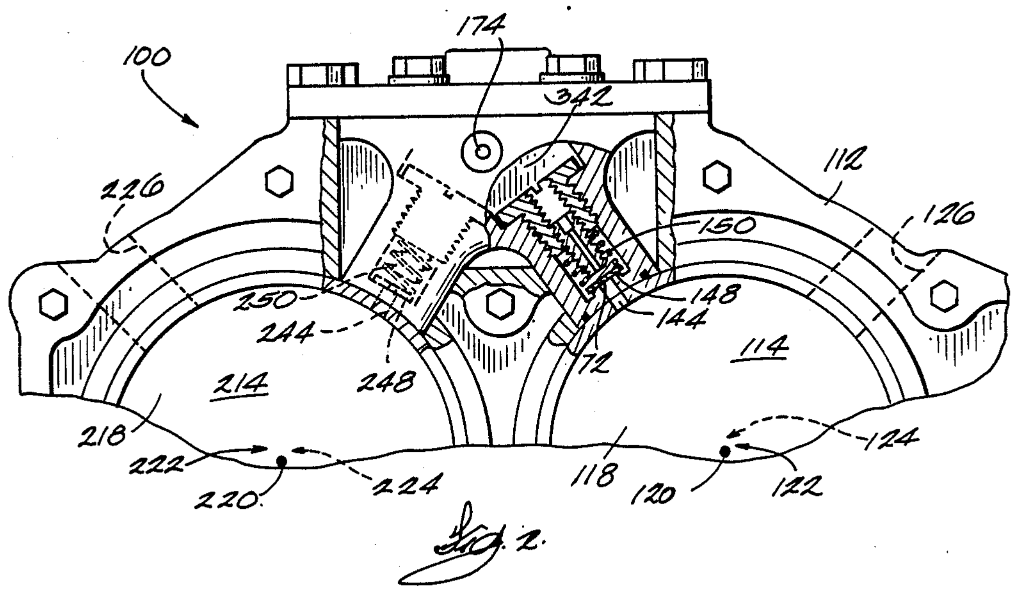
FIG. 2 is a fragmentary view, partially in section, of a portion of the internal combustion engine shown in FIG. 1.

Shown in FIG. 2 is an alternate two-stroke internal combustion engine 100 comprising an engine block 112. A first combustion chamber 114 is defined in the engine block 112 and is adapted to have a first piston 118 reciprocate therein along a first axis 120 between a top dead center position 122 and a bottom dead center position 124, and to have air and fuel combusted therein, thereby causing production of an exhaust gas and at least partially causing the first piston 118 to reciprocate. The internal combustion engine 100 further comprises a second combustion chamber 214 defined in the engine block 112 and adapted to have a second piston 218 reciprocate therein along a second axis 220 between a top dead center position 222 and a bottom dead center position 224, and to have air and fuel combusted therein, thereby causing production of an exhaust gas and at least partially causing the second position 218 to reciprocate.

The engine block 112 further comprises a first exhaust port 126 communicating with the first combustion chamber 114 and adapted to conduct the exhaust gas away from the first combustion chamber 114, and a second exhaust port 226 communicating with the second combustion chamber 214 and adapted to conduct the exhaust gas away from the second combustion chamber 214.

Means are provided for defining a sensor chamber 342. While various means could be employed, in the illustrated embodiment the sensor chamber 342 is at least partially defined in the engine block 112.

The internal combustion engine 100 further includes a first passage 144 extending from the sensor chamber 342 to the first combustion chamber 114 at a location between, with respect to the first axis 120, the first exhaust port 126 and the top dead center position 122 in the first combustion chamber 114, and a second passage 244 extending from the sensor chamber 342 to the second combustion chamber 214 at a location between, with respect to the second axis 220, the second exhaust port 226 and the top dead center position 222 in the second combustion chamber 214.

The internal combustion engine 100 further includes a first valve means, operable in the first passage 144, for allowing flow of exhaust gas from the first combustion chamber 114 to the sensor chamber 342 and for preventing flow of non-combusted air and fuel from the first combustion chamber 114 to the sensor chamber 342, a second valve means, operable in the second passage 244, for allowing flow of exhaust gas from the second combustion chamber 214 to the sensor chamber 342 and for preventing flow of non-combusted air and fuel from the second combustion chamber 214 to the sensor chamber 342, and means at least partially located in the sensor chamber 342 for sensing a condition in the exhaust gas in the sensor chamber 342.

While various other first and second valve means could be employed, in FIG. 2 the first valve means comprises a first disk 148 and a first spring 150 exerting a force on the first disk 148. The first disk 148 is adapted to travel against the force of the first spring 150 to a first open position when the pressure in the first combustion chamber 114 exceeds a predetermined pressure, and the second valve means comprises a second disk 248 and a second spring 250 exerting a force on the second disk 248. The second disk 248 is adapted to travel against the force of the second spring 250 to a second open position when the pressure in the second combustion chamber 214 exceeds a predetermined pressure.

The internal combustion engine 100 further includes an exit conduit adapted to conduct at least a portion of the exhaust gas in the sensor chamber 342 away from the sensor chamber 342. While various other configurations could be employed, in the embodiment shown in FIG. 2 the exit conduit comprises an aperture extending through at least one of the first and second disks, and communicating between the sensor chamber 342 and at least one of the first and second combustion chambers 114 and 214, respectively.

While various other sensing means could be employed, in FIG. 2 the sensing means comprises a heated zirconia oxygen sensor 174.

Various of the features of the invention are set forth in the following claims.

I claim:

1. A two-stroke internal combustion engine comprising an engine block, a combustion chamber defined in said engine block and adapted to have a piston reciprocate therein along an axis between a top dead center position and a bottom dead center position, and to have air and fuel combusted therein, thereby causing production of an exhaust gas and at least partially causing the piston to reciprocate, an exhaust port in said engine block and communicating with said combustion chamber and adapted to conduct the exhaust gas away from said combustion chamber, means defining a sensor chamber, a passage extending from said sensor chamber to said combustion chamber at a location axially between said exhaust port and the top dead center position, valve means operable in said passage between an open position for allowing flow of exhaust gas from said combustion chamber to said sensor chamber and a closed position for substantially preventing flow of non-combusted air and fuel from said combustion chamber to said sensor chamber, an exit conduit adapted to conduct at least a portion of the exhaust gas in said sensor chamber away from said sensor chamber, and means at least partially located in said sensor chamber for sensing a condition in the exhaust gas.

2. A two-stroke internal combustion engine in accordance with claim 1 wherein said valve means includes a disk, and a spring exerting a force on said disk, and wherein said disk is adapted to travel against said force of said spring to the open position when the pressure in said combustion chamber exceeds a predetermined pressure.

3. A two-stroke internal combustion engine in accordance with claim 2 and further including means for adjusting the predetermined pressure.

4. A two-stroke internal combustion engine in accordance with claim 3 wherein said means for adjusting the predetermined pressure comprises means for adjustably compressing said spring.

5. A two-stroke internal combustion engine in accordance with claim 4 wherein a valve body houses said disk and said spring, wherein a chamber defining member is mounted to said valve body, wherein said sensor chamber is defined by said chamber defining member, wherein said spring is located between said disk and said chamber defining member and biases said disk from said chamber defining member along a second axis to the closed position, and wherein said means for adjustably compressing said spring comprises said chamber defining member being adjustably movable relative to said valve body along said second axis.

6. A two-stroke internal combustion engine in accordance with claim 5 wherein said means for adjustably compressing said spring further comprises a sleeve supported by said valve body, movable relative to said valve body along said second axis, surrounding and guiding said spring, and including a portion separating said spring from said chamber defining member.

7. A two-stroke internal combustion engine in accordance with claim 5 and further including means for allowing said disk to travel against said spring by a distance not exceeding a predetermined distance, and for allowing the predetermined distance to be adjusted.

8. A two-stroke internal combustion engine in accordance with claim 7 wherein said means for allowing said disk to travel a distance not exceeding a predetermined distance, and for allowing the predetermined distance to be adjusted, comprises a stop member supported by said chamber defining member, being adjustable along said second axis relative to said chamber defining member, and having a hollow portion extending along said second axis and defining a portion of said passage.

9. A two-stroke internal combustion engine in accordance with claim 2 wherein said exit conduit includes an aperture extending through said disk and communicating between said sensor chamber and said combustion chamber.

10. A two-stroke internal combustion engine in accordance with claim 2 wherein said passage has a portion between said disk and said combustion chamber, which portion has a volume that is sufficiently small so that non-combusted air and fuel is not sampled.

11. A two-stroke internal combustion engine in accordance with claim 2 wherein said sensing means is adapted to sense the concentration of a chemical compound in said sensor chamber.

12. A two-stroke internal combustion engine in accordance with claim 11 wherein said sensing means comprises a zirconia oxygen sensor.

13. A two-stroke internal combustion engine in accordance with claim 7 wherein said passage includes a lapped valve seat, and wherein said disk is lapped.

14. A two-stroke internal combustion engine in accordance with claim 11 and further including means for supplying air and fuel to said combustion chamber in an adjustable ratio and for adjusting the air and fuel ratio responsive to the concentration sensed by said sensing means.

15. A two-stroke internal combustion engine in accordance with claim 14 wherein said means for supplying air and fuel and for adjusting the air and fuel ratio comprises an electronic fuel injection system.

16. A two-stroke internal combustion engine comprising an engine block, a first combustion chamber defined in said engine block and adapted to have a first piston reciprocate therein along a first axis between a top dead center position and a bottom dead center position in said first combustion chamber and to have air and fuel combusted therein thereby causing production of an exhaust gas and at least partially causing the first piston to reciprocate, a second combustion chamber defined in said engine block and adapted to have a second piston reciprocate therein along a second axis between a top dead center position and a bottom dead center position in said second combustion chamber, and to have air and fuel combusted therein, thereby causing production of an exhaust gas and at least partially causing the second piston to reciprocate, a first exhaust port in said engine block and communicating with said first combustion chamber and adapted to conduct the exhaust gas away from said first combustion chamber, a second exhaust port in said engine block and communicating with said second combustion chamber and adapted to conduct the exhaust gas away from said second combustion chamber, means defining a sensor chamber, a first passage extending from said sensor chamber to said first combustion chamber at a location between, with respect to the first axis, said first exhaust port and the top dead center position in said first combustion chamber, a second passage extending from said sensor chamber to said second combustion chamber at a location between, with respect to the second axis, said second exhaust port and the top dead center position in said second combustion chamber, an exit conduit adapted to conduct at least a portion of the exhaust gas in said sensor chamber away from said sensor chamber, a first valve means operable in said first passage between a first open position for allowing flow of exhaust gas from said first combustion chamber to said sensor chamber and a first closed position for substantially preventing flow of non-combusted air and fuel from said first combustion chamber to said sensor chamber, a second valve means operable in said second passage between a second open position for allowing flow of exhaust gas from said second combustion chamber to said sensor chamber and a second closed position for substantially preventing flow of non-combusted air and fuel from said second combustion chamber to said sensor chamber, and means at least partially located in said sensor chamber for sensing a condition in the exhaust gas in said sensor chamber.

17. A two-stroke internal combustion engine in accordance with claim 16 wherein said first valve means comprises a first disk and a first spring exerting a force on said first disk, wherein said first disk is adapted to travel against said force of said first spring to the first open position when the pressure in said first combustion chamber exceeds a predetermined pressure, wherein said second valve means comprises a second disk and a second spring exerting a force on said second disk, and wherein said second disk is adapted to travel against said force of said second spring to the second open position when pressure in said second combustion chamber exceeds a predetermined pressure.

18. A two-stroke internal combustion engine in accordance with claim 17 wherein said exit conduit includes an aperture extending through at least one of said first and second disks, and communicating between said sensor chamber and at least one of said first and second combustion chambers.

19. A two-stroke internal combustion engine in accordance with claim 17 wherein said sensing means comprises an oxygen sensor.

20. A two-stroke internal combustion engine comprising an engine block, a combustion chamber defined in said engine block and adapted to have air and fuel combusted therein, a piston adapted to reciprocate in said combustion chamber along an axis between a top dead center position and a bottom dead center position, an exhaust port in said engine block and communicating with said combustion chamber and adapted to conduct combusted air and fuel away from said combustion chamber, means defining a sensor chamber, a passage extending from said sensor chamber to said combustion chamber at a location axially between said top dead center position and said exhaust port and proximate said exhaust port, an exit conduit adapted to conduct combusted air and fuel from said sensor chamber, a disk valve operable in said passage between an open position and a closed position, said disk valve including a disk and a spring exerting a force on said disk, said disk being adapted to travel against the force of said spring to the open position to allow flow of combusted air and fuel from said combustion chamber to said sensor chamber when pressure in said combustion chamber exceeds a predetermined pressure, an oxygen sensor at least partially located in said sensor chamber, and means for supplying air and fuel to said combustion chamber in an adjustable ratio and for adjusting the air and fuel ratio.

21. A two-stroke internal combustion engine in accordance with claim 20 wherein said means for supplying air and fuel and for adjusting the air and fuel ratio comprises an electronically controlled fuel injection system.

* * * * *